July 25, 1933. G. K. BEDUR 1,919,356
HOSE
Filed May 12, 1932
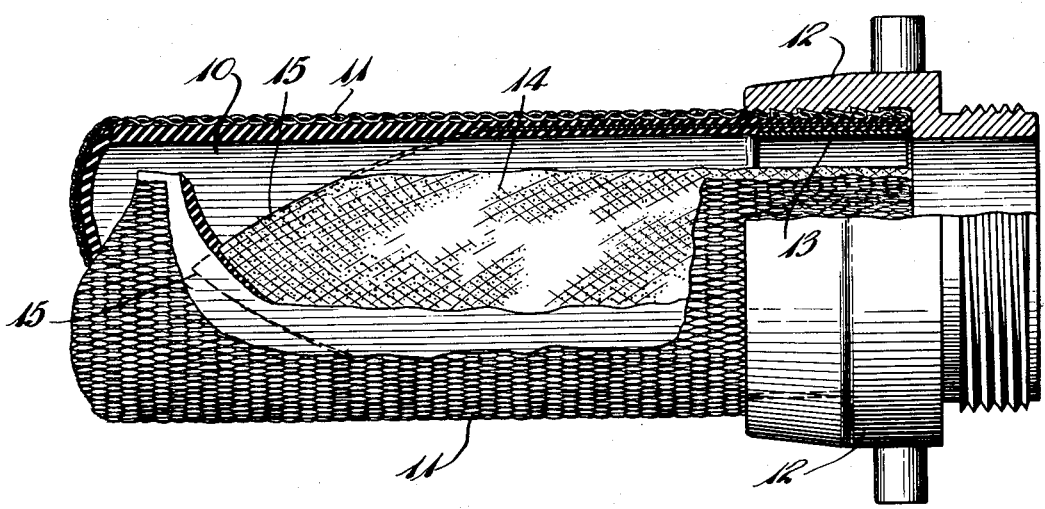
Inventor
George K. Bedur
By Eakin & Avery
Attys.

Patented July 25, 1933

1,919,356

UNITED STATES PATENT OFFICE

GEORGE K. BEDUR, OF AKRON, OHIO, ASSIGNOR TO THE B. F. GOODRICH COMPANY, OF NEW YORK, N. Y., A CORPORATION OF NEW YORK

HOSE

Application filed May 12, 1932. Serial No. 610,846.

This invention relates to hose and more especially to hose having relatively thin, flexible walls such as fire hose.

The principal object of the invention is to provide increased life of the hose and to provide gradually increasing rigidity to the hose adjacent its couplings.

Other objects will appear from the following description and the accompanying drawing.

Referring to the drawing, which illustrates a section of a length of hose having a rigid coupling member secured thereto, the device being shown partly in section, parts being broken away, the numeral 10 designates the rubber lining which extends throughout the length of the hose, and the numeral 11 the woven jacket extending thereover. One of the coupling members 12 is shown as mounted on one end of the hose, the hose extending partly through the coupling member, and being held in secure engagement therewith by a metal ring 13 inserted within that part of the hose extending within the coupling member, and expanded in place to clamp the walls of the hose against the serrated wall of the coupling member. A reinforcing layer of fabric 14 is assembled between the plies of rubber constituting the rubber lining and extends only a short distance from the coupling. This reinforcement is preferably made of tire breaker fabric having its threads or cords extending at an acute angle to the axis of the hose. That end of the reinforcement extending away from the coupling is preferably notched deeply to provide a fish-tailed margin 15 whereby the reinforcing effect of the fabric is gradually reduced in a direction away from the coupling.

In the manufacture of hose of this construction the jacket is first woven and cut to the desired length. The rubber lining is then prepared by seaming the longitudinal edges of a sheet of rubber of the same length as the jacket. The fabric reinforcements 14 are laid between plies of the rubber sheet at its ends. The rubber tube reinforced with fabric at its ends is then pulled through the jacket and vulcanized in place by internal pressure. The ends of the hose are trimmed, the coupling members are placed thereover, and the bushings 13 expanded into place.

The reinforcement 14 provides increased strength and rigidity to the hose at a zone adjacent to the coupling member and prevents sharp bending of the hose where it meets the coupling. It distributes any longitudinal strains, such as are caused by pulling the hose, over an increased area and transmits them from the coupling to the jacket at a position remote from that at which the cords of the jacket are subjected to pinching by compression against the edge of the coupling. This greatly increases the life of the hose without adding substantially to its weight or its cost.

The notching of the reinforcement to provide the fish-tail margin assures that no sharply defined bending zone will be present in the hose near the coupling. The extension of the rubber of the lining between the end reinforcement and the jacket provides for equalizing the distribution of strains to all the horizontal cords of the jacket, and the extension of the rubber jacket over the inside of the reinforcement provides for protection of the reinforcement from moisture.

All of these features contribute to the life of the hose and to the reduction of maintenance expense by reducing the necessity for renewing couplings to that due to actual coupling wear. The presence of the reinforcement adjacent the end of the hose prevents the cutting of the hose at the edge of the expansion ring due to weakening of the rubber lining due to age.

I claim:

1. A hose comprising a textile jacket and an all-rubber lining therefor, a coupling member engaging an end of the hose, and a reinforcement comprising a bias-laid collar of textile material extending from that portion of the base engaged by the coupling only to a zone of the hose adjacent thereto for distributing longitudinally applied strains from the coupling member to a substantial area of the jacket.

2. A hose comprising a woven jacket and an all-rubber lining therefor, a coupling member engaging an end of the hose, and a reinforcing layer of bias-laid breaker fabric extending only through that portion of the wall of the hose engaged by said coupling member and closely adjacent thereto.

3. A hose comprising a jacket and an all-rubber lining therefor, a coupling member engaging an end of the hose, and a reinforcing layer of breaker bias laid fabric extending only through that portion of the wall of the hose engaged by said coupling member and closely adjacent thereto, the margin of said reinforcement remote from said coupling being inclined to a plane perpendicular to the axis of the hose.

4. A hose comprising a jacket and an all-rubber lining therefor, a coupling member engaging an end of the hose, and a reinforcing layer of bias-laid breaker fabric extending only through that portion of the wall of the hose engaged by said coupling member and closely adjacent thereto, the margin of said reinforcement remote from said coupling being notched to provide a fish-tail edge.

5. A hose comprising a jacket and an all-rubber lining therefor, a coupling member engaging an end of the hose, and a reinforcing layer of bias-laid fabric extending only along that portion of the hose engaged by said coupling and closely adjacent thereto, said reinforcement being less flexible at the coupling than at its margin remote therefrom.

GEORGE K. BEDUR.